Sept. 26, 1972 GASPER CAFIERO 3,694,294

SPLICING APPARATUS FOR SPLICING STRIP MATERIAL, AS FILM OR MAGNETIC TAPE

Filed Nov. 27, 1970 3 Sheets-Sheet 1

INVENTOR
GASPER CAFIERO
BY James and Franklin
ATTORNEY

INVENTOR
GASPER CAFIERO
BY James and Franklin
ATTORNEY

Sept. 26, 1972 GASPER CAFIERO 3,694,294

SPLICING APPARATUS FOR SPLICING STRIP MATERIAL, AS FILM OR MAGNETIC TAPE

Filed Nov. 27, 1970 3 Sheets-Sheet 3

INVENTOR
GASPER CAFIERO
BY James and Franklin
ATTORNEY

United States Patent Office 3,694,294

Patented Sept. 26, 1972

3,694,294

SPLICING APPARATUS FOR SPLICING STRIP MATERIAL, AS FILM OR MAGNETIC TAPE

Gasper Cafiero, Brooklyn, N.Y., assignor to Metra Electronics Corporation, Brooklyn, N.Y.

Filed Nov. 27, 1970, Ser. No. 93,100
Int. Cl. G03d *15/04*; B26d *5/08*
U.S. Cl. 156—507 5 Claims

ABSTRACT OF THE DISCLOSURE

Splicing apparatus for splicing strip material comprises a splicing stage having a longitudinally extending groove therein adapted to holdingly receive the two ends of the strip material to be spliced. The stage is provided with a movable cutting block, which in a first position has its upper surface flush with the operative surface of the stage. The cutting block is provided with a mating groove forming a continuation of the groove on the stationary portion of the stage. Means are provided for lifting the cutting block to a second position in which parallel cutting edges on the lower surface of said cutting block at opposite edges thereof are in raised position and adapted to receive the non-mating strip ends thereunder. As the block is returned to its flush position strip edges are simultaneously severed to form accurately mated edges on said strip ends whereupon said strip ends may be moved within said groove on said cutting block into substantially contiguous abutting relationship for splicing. In accordance with the method of the present invention the above is carried out in substantially one continuous movement.

The present invention relates to splicing apparatus and particularly to such apparatus for use in slicing strip material such as film or magnetic tape.

Splicing of strip material is required in various industries such as those dealing with film or magnetic tape. Often in these applications the splicing must be accomplished with great precision in order to produce an acceptable product. For example, in the magnetic tape industry the most recent development is the multi-track cartridge wherein a lengthy recording may be impressed on several tracks of a single endless strip of magnetic tape mounted in a small cartridge. The final step in the manufacture of such endless magnetic tape is the splicing of the two tape edges togegether. For this purpose the tpae edges must be brought together in substantially contiguous abutting relationship and a small segment of splicing tape, commonly a pressure sensitive adhesive tape with an aluminum foil backing, is affixed to both ends thereof to join the tape in an endless loop. In order to avoid imperfections in the recording it is imperative that the two strip edges to be joined are accurately trimmed to mating configurations and precisely positioned in abutting relationship prior to the actual splicing operation.

The process of tape splicing has in the past been accomplished both manually and automatically. Apparatus has been designed for automatically feeding, cutting and affixing a splicing tape to the ends of the strip material to be spliced in response to a manual punch mechanism or solenoid actuation or the like. However, the most delicate part of the operation, the accurate positioning of the strip ends in abutting relationship, must still be done manually and requires considerable time, effort and skill. This manual operation comprises two parts. First the strip ends must be trimmed or squared off to form accurately mated edges, adapted when brought into abutting relationship to form a substantially contiguous strip. Secondly, the thus squared off edges must be brought together and maintatined in substantially contiguous abutting relationship prior to the application of the adhesive splicing tape.

The most common method of forming mating splicing edges is to bring the strip ends together in an overlapping relationship and perform one cutting operation at the overlapped area. The cutting operation is commonly done manually with a razor blade or the like. The strip ends must then be again spaced from each other to remove the waste material produced and then brought back into abutting relationship on a splicing stage or the like. It will be apparent that this procedure is cumbersome and time consuming in that it requires several distinct manual operations.

Apparatus has been in the past designed for trimming strip edges without bringing the strips into overlapping relationship. Such prior art apparatus, however, is rather complicated and in any event requires two separate cutting operations for trimming the two edges to be spliced together. As a result, the overlap method is still the most common and effective method for preparing the strip edges to be spliced.

Accordingly, it is a primary object of the present invention to provide a strip splicing apparatus which is particularly adapted to trim the strip edges of the two ends of the strip material to be spliced in substantially the same continuous operation in which such edges are brought together and positioned in abutting contiguous relationship.

It is still a further object of the present invention to provide a splicing apparatus of the type described which allows for rapid, accurate and inexpensive splicing of two strip ends having non-mating edges.

It is yet a further object of the present invention to provide strip splicing apparatus in which the non-mating strip ends may be trimmed to form accurately matting edges while in spaced relationship prior to being brought together for splicing.

It is still another object of the present invention to provide a rather simple and inexpensive apparatus of the type described combining means to simultaneously cut accurately mating edges on two strip ends and means for guiding said strip ends to a position wherein said accurately mated edges are in a substantially contiguous abutting relationship, all in one substantially uninterrupted manual operation.

To these ends the splicing apparatus of the present invention comprises a splicing stage having a longitudinally extending groove adapted at either end to holdingly slidingly receive the strip ends to be spliced. A cutting block having spaced apart mating cutting edges on its lower surface is movably mounted substantially centrally of the splicing stage. In a first position the upper surface of the cutting block is flush with the remainder of the stage, the cutting block being provided with a tape groove aligned with and forming a continuation of the longitudinal tape grooves on the fixed portions of the stage at either side thereof. In a second position of the cutting block the accurately mated spaced cutting edges thereon are disposed above the plane of the tape grooves on the fixed portion of the splicing stage and are thus adapted to receive thereunder the unmated tape ends. As the cutting block is returned to its flush position the cutting edges thereon cooperate with the substantially contiguous edges of the fixed portion of the splicing stage on either side thereof to simultaneously sever the tape ends, thereby forming accurately mated tape edges. The strip ends may thereafter be moved along the tape groove on the upper surface of the cutting block into substantially contiguous abutting relationship and the splicing tape may be applied. In accordance with the method of the present invention, the cutting operation is done simultaneously with the movement of the strip ends toward each other, no interruption of this movement being necessary. As a result, the trimming operation does not require any additional time or separate positioning operations, the entire process being accomplished expeditiously in substantially one uninterrupted movement.

To the accomplishment of the above and to such other objects as may hereinafter appear the present invention relates to a method and apparatus for splicing strip material as defined in the appended claims and as described herein with reference to the accompanying drawings in which:

Figure 1:
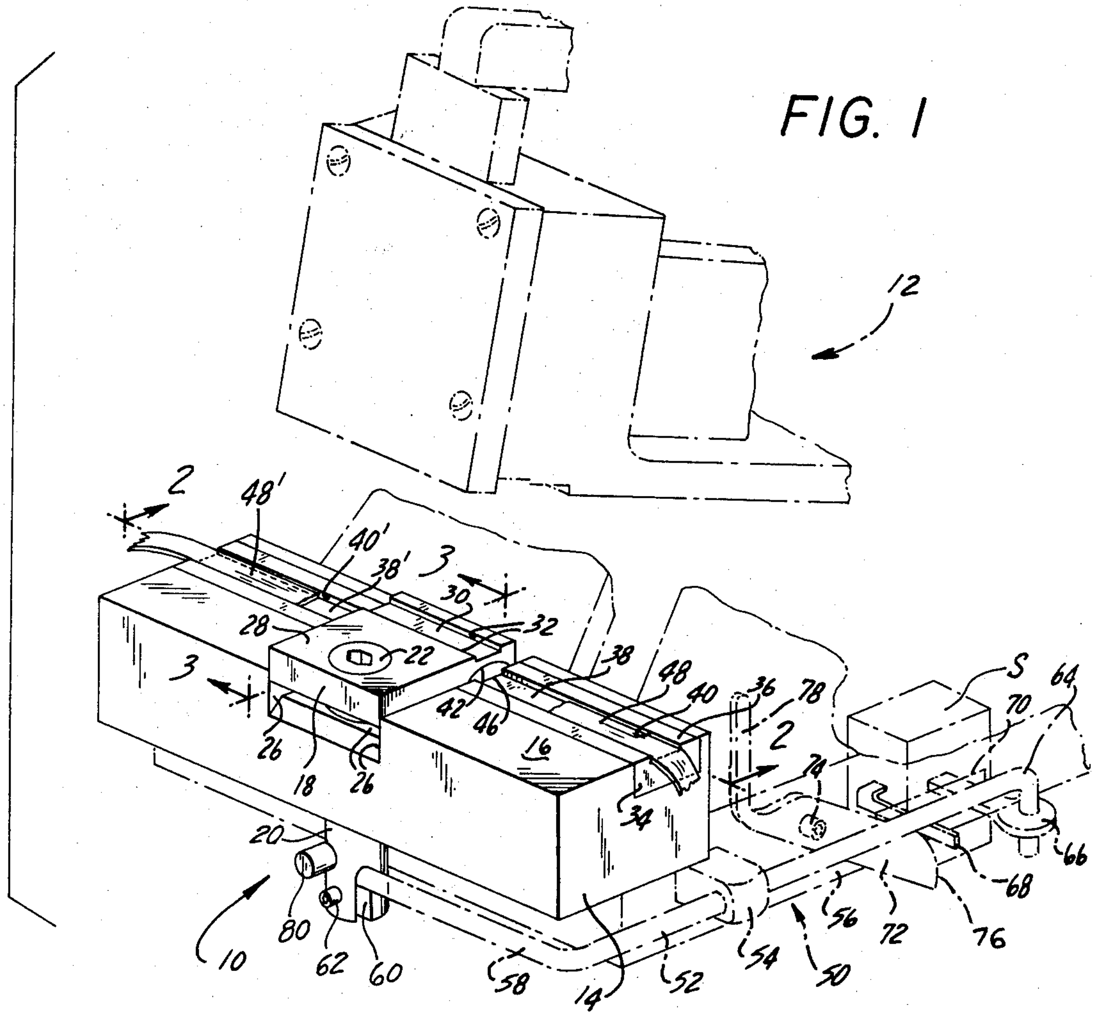
FIG. 1 is a fragmentary perspective view showing the splicing apparatus of the present invention including the splicing stage and the adhesive tape applying mechanism.

As best illustrated in FIG. 1 the splicing apparatus of the present invention comprises a strip mounting appparatus generally designated 10 and a mechanism generally designated 12 for feeding, cutting and applying adhesive splicing tape to the appropriately positioned strip ends of the strip material to be spliced. Mechanism 12 is only partly illustrated in broken lines and may consist of any suitable mechanism for applying a strip of adhesive tape to a splicing joint. In this regard a mechanism particularly suitable for this purpose is fully disclosed in my copending application Ser. No. 30,664 entitled "Strip Feeding and Cutting Mechanism" filed Apr. 22, 1970 and assigned to the assignee of the present invention. In accordance with that disclosure a suitable width of adhesive tape is automatically fed, cut and applied with sutiable pressure to the abutting edges of the strip material to be spliced in response to a single plunger stroke. In a more advanced form, the mechanism may be designated to be automatically actuated by a solenoid controlled by the operator's foot pedal.

Prior to applying the adhesive tape the strip ends must be accurately trimmed to form mating edges thereon and brought together in substantially aligned contiguous abutting relationship directly under mechanism 12. For this purpose strip mounting apparatus 10 comprises a strip mounting stage 14 upon the upper surface 16 of which the strip material is adapted to be trimmed and operatively positioned for splicing.

Figure 3:
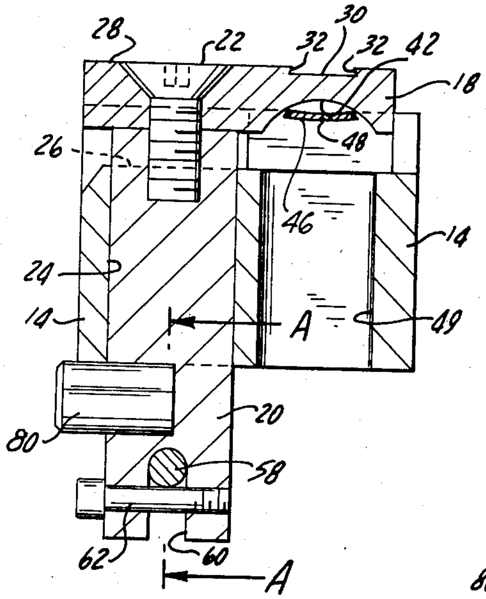
FIG. 3 is a cross-sectional view taken along the line 3—3 of FIG. 1.

Accordingly, a cutting block 18 is mounted centrally of stage 14 on the upper end of a post 20 by means of flat head screw 22 (see FIG. 3). Post 20 is in turn slidably received in an aperture 24 in stage 14, said aperture terminating at its upper end in a recess 26 adapted to slidably receive cutting block 18. As a result, cutting block 18 is adapted to slide vertically into and out of recesss 26 in stage 14.

Figure 12:
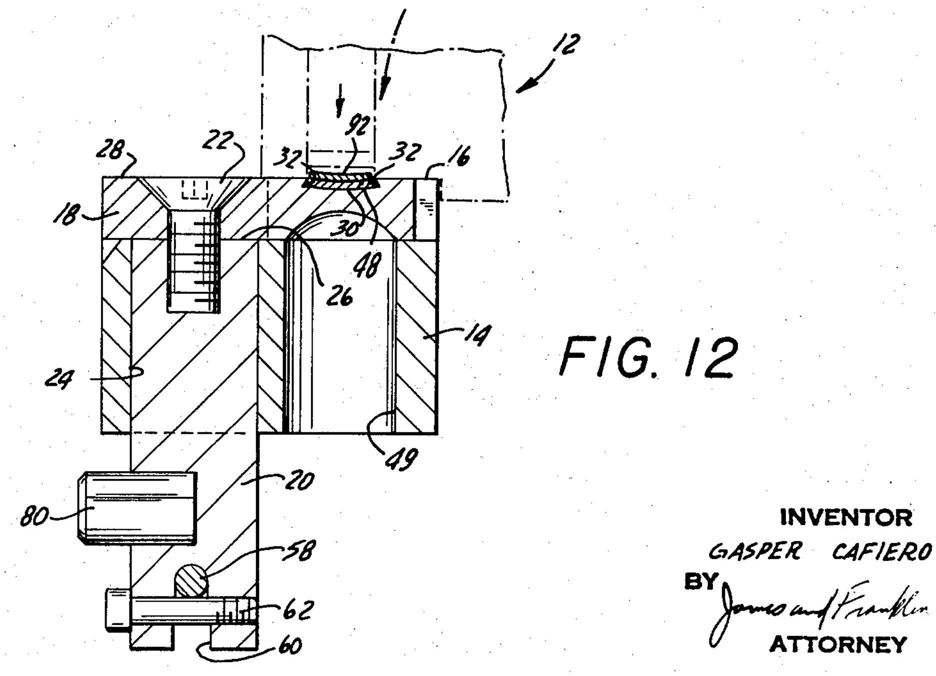
FIG. 12 is a cross-sectional view of the splicing stage similar to FIG. 3 showing the splicing tape being applied to the strip material operatively disposed on the splicing stage.

As best shown in FIG. 12, when cutting block 18 is in its lowermost position fully received within recess 26, its upper surface 28 lies flush with the upper surface 16 of stage 14 thereby to provide a continuous horizontal splicing surface (see FIG. 12). Cutting block 18 is preferably made of hardened steel and is provided at its upper surface 28 with a longitudinally extending concave groove 30 rearwardly of screw 22 and adapted to receive the two strip ends to be spliced. Groove 30 is provided with inwardly inclined side surfaces 32 so that strip material may be slidingly holdingly received therein. Likewise the upper surface 16 of stage 14 is provided on either side of cutting block 28 with a longitudinally extending hardened steel insert 34, the upper surface 36 of which lies flush with the upper surface 16 of stage 14 and is provided with longitudinally extending grooves 38, 38' aligned with groove 30 on cutting block 18 and having corresponding inwardly inclined side surfaces 40, 40'. Accordingly when cutting block 18 is in its lowermost position (FIG. 12) strip receiving grooves 38, 38' and 30 are precisely aligned and form a continuous longtiudinally extending strip receiving groove.

Figure 2:
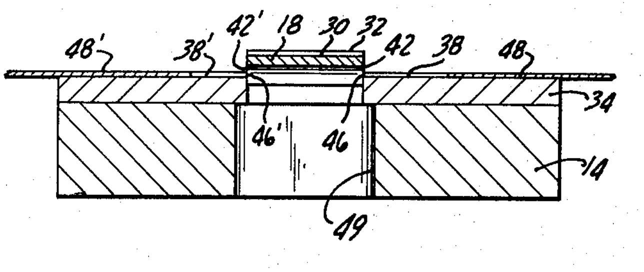
FIG. 2 is a cross-sectional view taken along the line 2—2 of FIG. 1.

As best shown in FIGS. 1 and 2 cutting block 18 is provided at its lower surface at either side thereof with concave cutting edges 42, 42' extending transversely of groove 30. In the position shown in FIGS. 1 and 2 cutting edges 42, 42' extend partially above the strip receiving surfaces of grooves 38 and 38' on opposite sides of the upper surface 16 of stage 14. The terminal edges of said strip receiving surfaces of grooves 38 and 38' at their intersection with the vertical sides of recess 26 serve as cutting edges 46 and 46', respectively. Thus as best illustrated in FIGS. 1 and 3 the ends of the strip material 48 and 48' may be placed in grooves 38 and 38', respectively, and slid therealong toward each other beyond cutting edges 46 and 46' and under cutting edges 42 and 42'. As cutting block 18 is returned to its flush position (FIG. 12) cutting edges 42 and 42' on the lower surface of cutting block 18 are effective to cooperate with cutting edges 46 and 46', respectively, on the upper surface of stage 14 to simultaneously sever the strip ends 48 and 48', respectively. An aperture 49 is provided in stage 14 directly beneath cutting edges 42 and 42' so that the waste trimmed from strip edges 48 and 48' may fall therethrough into an appropriate receptable (not shown (see FIG. 7). In accordance with the method of this invention the operator then continues to move the trimmed strip ends along groove 30 in the upper surface of cutting block 18 into substantially contiguous abutting relationship under splicing mechanism 12, whereupon the abutting strip ends are spliced together by the application of a segment of adhesive tape.

Figure 3A:
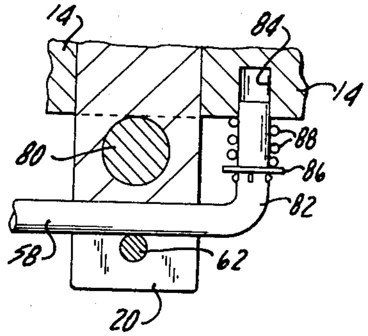
FIG. 3A is a fragmentary cross-sectional view taken along the lines A—A of FIG. 3.

By reason of the unique features of the present apparatus the foregoing operation may be readily and safely carried out by the operator in substantially one continuous movement. Thus suitable means are provided for rapidly lifting cutting block 18 to the position shown in FIGS. 1 and 3 and returning said block to its flush position shown in FIG. 12. In accordance with a preferred embodiment of the apparatus such means comprise a solenoid actuated pivotal linkage mechanism generally designated 50. As best shown in FIG. 1 (in broken lines, it comprises a link 52 journaled in a sleeve 54 mounted on a framework generally designated 56. Link 52 is provided with a portion bent inwardly at right angles and extending under stage 14 as shown at 58. As best shown in FIGS. 3 and 3A link portion 58 is received within a slot 60 at the bottom surface of post 20 and retained therein by suitable means such as screw 62 extending transversely through slot 60. The other end of link 52 is provided with a downwardly extending portion 64 which is operatively connected to a suitable rod 66 which is in turn actuated by a solenoid S within framework 56 (shown schematically in broken lines in FIG. 1). The solenoid is adapted to be actuated by means of a lever 68 operatively connected to the solenoid at one end and projecting through a slot 70 in frame work 56 for slidable movement therein. A second lever 72 is pivotally mounted at 74 on framework 56 and is provided at one end with a curved surface 76 in contact with lever 68. The other end of link 72 is provided with a vertically upstanding trigger 78 adjacent the righthand rear corner of stage 14 (as viewed in FIG. 1). Thus, trigger 78 is readily actuatable by the operator's finger, i.e. pinky finger, at the same time that the strip ends are being guided toward each other within grooves 38, 38' and 30 on stage 14 and cutting block 18, respectively.

Upon movement of trigger 78 towards stage 14 lever 72 pivots at 74 and thus curved surface 76 moves upwardly to cause the outwardly extending end of lever 68 to move rearwardly within slot 70. As a result of this movement lever 68 is adapted to actuate the solenoid (for example by closing a contact) whereupon rod 66 is pulled to the left (as viewed in FIG. 1) causing link 52 to rotate within sleeve 54. As a result portion 58 of link 52 pivots upwardly carrying post 20 and thus cutting block 18 to the position shown in FIG. 3. As there shown, the lower end of post 20 is in addition provided with an outwardly extending peg 80 which is adapted to limit the upward movement of block 18 to the position shown in FIG. 3 by virtue of its engagement with the lower surface of stage 14.

As trigger 78 is released the reverse process takes place, lever 72 pivoting back to its original position, thereby releasing lever 68 from its solenoid actuated position and link 52 rotates counterclockwise lowering portion 58, post 20 and cutting block 18 to the position shown in FIG. 12. In order to insure a quick return stroke, cutting block 18 is preferably spring biased to its flush position (FIG. 12). As best shown in FIG. 3A, for this purpose link portion 58 is bent upwardly at 82 at the other side of post 20 and is received in a recess 84 in the underside of stage 14. Vertical portion 82 is provided with a flange 86 extending therefrom below stage 14. A coil compression spring 88 is positioned between flange 86 and stage 14 and is effective to rapidly return link portion 58 and post 20 to their lowermost position as the solenoid is de-energized.

Figure 4:
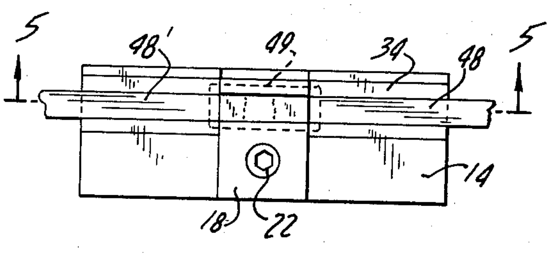
FIG. 4 is a top plan view of the splicing stage of FIG. 1 showing the strip ends disposed thereon preparatory to trimming thereof.
Figure 5:
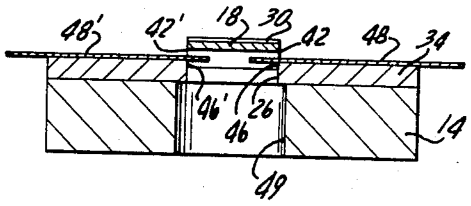
FIG. 5 is a cross-sectional view taken along the lines 5—5 of FIG. 4.
Figure 6:
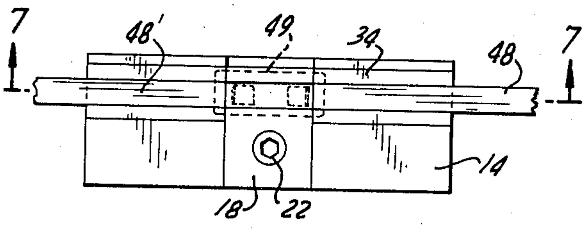
FIG. 6 is a top plan view of the splicing stage of FIG. 1 showing the strip material operatively disposed thereon just subsequent to trimming thereof.
Figure 7:
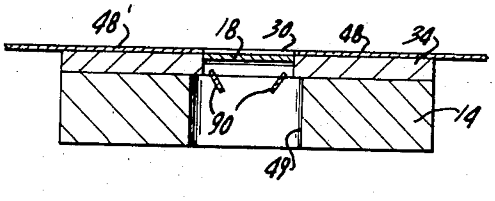
FIG. 7 is a cross-sectional view taken along the line 7—7 of FIG. 6.
Figure 8:
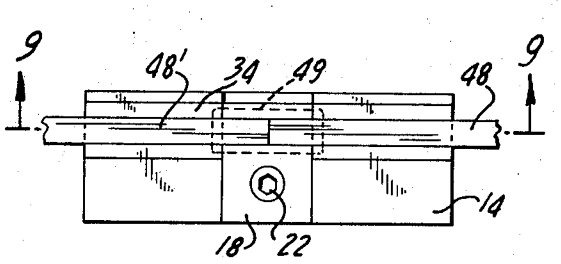
FIG. 8 is a top plan view of the splicing stage of FIG. 1 showing the two strip ends accurately trimmed and brought together in substantially contiguous abutting relaitonship preparatory to splicing.
Figure 9:
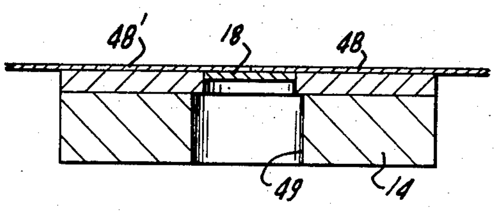
FIG. 9 is a cross-sectional view taken along the line 9—9 of FIG. 8.
Figure 10:
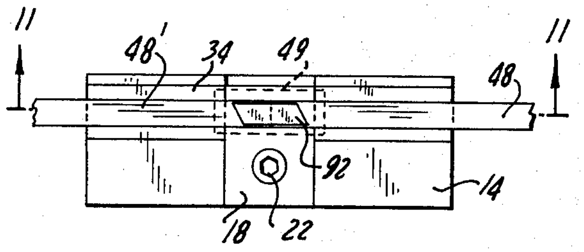
FIG. 10 is a top plan view of the splicing stage of FIG. 1 showing the strip material operatively disposed thereon subsequent to splicing.
Figure 11:
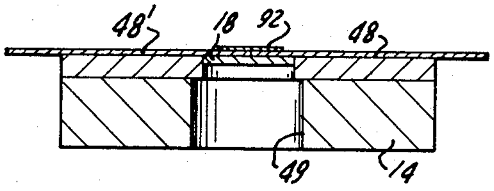
FIG. 11 is a cross-sectional view taken along the line 11—11 of FIG. 10.

The method of the present invention will be apparent from the foregoing description taken together with FIGS. 4 through 11 of the drawings. As best shown in FIG. 4 the strip material comprising strip ends 48 and 48' are placed in grooves 38 and 38', respectively, on the upper surface of stage 14 and the operator preferably using his two forefingers moves said strip ends inwardly towards each other. At the same time the operator using his little finger deflects trigger 78 inwardly, thereby actuating the solenoid S and lifting cutting block 18 to the position shown in FIG. 1 and schematically shown in FIG. 5. The operator continues to move strip ends 48 and 48' inwardly towards each other until the unmated edges thereof have passed beyond cutting edges 46 and 46' on the upper surface of stage 14 and under cutting edges 42 and 42' on the lower surface of cutting block 18. At this point trigger 78 is released, thereby de-energizing solenoid S, whereupon cutting block 18 is rapidly returned to its flush position by means of spring 88, cutting edges 42 and 42' cooperating with cutting edges 46 and 46', respectively, to sever the unmated strip ends along accurately mated edges. This process is best shown in FIG. 7. As there illustrated the severed segments 90 are adapted to fall through aperture 49 in stage 14 into a suitable receptacle (not shown). By virtue of the quick return of cutting block 18 to the flush position shown in FIG. 7 the aforementioned cutting operation need not cause any substantial interruption in the movement of the strip ends 48 and 48' inwardly towards each other. Accordingly, the operator continues to move such strip ends toward each other and the now accurately mated edges are slidingly received in the matching strip receiving groove 30 on the upper surface of cutting block 18. This operation is continued until the strip ends are brought into substantially contiguous abutting relationship as shown in FIGS. 8 and 9. A segment of adhesive tape material 92 is then applied to the accurately mated abutted strip ends as shown in FIGS. 10 and 11.

As a result of the curvature of cutting edges 42 and 42' on cutting block 18 the strip ends are rapidly and cleanly severed without pulling or binding (see FIG. 3). In addition, the upward movement of cutting block 18 is limited (by peg 80) such that cutting edges 42 and 42' are disposed only slightly above the strip receiving grooves on the upper surface of stage 14. As a result the spaces between the cooperating cutting edges, while sufficient to accommodate the strip ends, is quite insufficient to allow for accidental insertion of the operator's fingers, thus eliminating possible safety hazards.

It will be appreciated from the foregoing that the present apparatus and method substantially improves the accuracy, effectiveness and speed of splicing of strip material. The device is relatively simple and inexpensive to manufacture and may be operated with relative ease and safety. As a result strip material may be completely accurately and effectively spliced more rapidly than it would normally take merely to trim the edges using conventional apparatus and procedures. Finally, when combined with automated adhesive tape feeding and cutting apparatus the splicing operation may be accomplished with a speed and accuracy formerly unattainable in the trade.

While only a single preferred embodiment of the present invention is herein specifically described, it will be appreciated that many variations may be made therein all within the scope of the present invention as defined in the following claims.

I claim:

1. In a strip splicing apparatus for splicing two strip ends having non-mating edges comprising a splicing stage, said splicing stage comprising first and second operative support surfaces having first and second guide grooves, respectively, within which said strip ends are adapted to be positioned, respectively, for splicing, first and second spaced cutting edges defined by the inwardly facing edges of said first and second guide grooves on said splicing stage, a cutting block mounted on said splicing stage for movement between first and second positions into and out of the space defined between said first and second support surfaces, respectively, one surface of said cutting block having a third guide groove, said third guide groove being flush with and operatively aligned with said first and second guide grooves on said splicing stage when said cutting block is in said second position, said cutting block having third and fourth cutting edges disposed at opposite sides thereof below said third guide groove, said third and fourth cutting edges, in said first position of said cutting block, being disposed above said first and second cutting edges of said splicing stage in operative shearing relationship therewith with clearance for said strip ends to pass thereunder, and means to move said cutting block from said first to said second position thereby to bring said third and fourth cutting edges through the plane of said strip ends substantially in a single simultaneous motion in shearing relationship with said first and second cutting edges, respectively, to shear said strip ends, said strip ends thereafter being moved along said third guide groove in opposite directions into abutting relationship for splicing.

2. The strip splicing apparatus of claim 1, wherein said first, second and third guide grooves are concave and are provided with inwardly inclined side walls adapted to holdingly slidingly receive said strip ends in substantially aligned relationship.

3. The strip splicing apparatus of claim 1, wherein said cutting block is spring biased to said second position, manually actuatable means for moving said cutting block against said spring bias to said first position, said cutting block returning to said second position under the influence of said spring bias upon release of said manually actuatable means.

4. The strip splicing apparatus of claim 3, wherein said first, second and third guide grooves are concave and are provided with inwardly inclined side walls adapted to holdingly slidingly receive said strip ends in substantially aligned relationship.

5. The strip splicing apparatus of claim 1, wherein said first, second, third and fourth cutting edges are concave whereby said strip ends are effectively sheared from opposite sides thereof.

References Cited

UNITED STATES PATENTS

| | | | |
|---|---|---|---|
| 3,169,896 | 2/1965 | Dresser | 156—507 |
| 3,185,608 | 5/1965 | Nagy | 156—506 |
| 1,972,536 | 9/1934 | Rohrdanz | 156—507 |
| 2,294,950 | 9/1942 | Babcock | 156—507 |
| 3,077,808 | 2/1963 | Post | 83—620 X |

PHILIP DIER, Primary Examiner

U.S. Cl. X.R.

83—581, 620; 156—505, 159, 258